(12) United States Patent
Raviart et al.

(10) Patent No.: US 11,293,209 B2
(45) Date of Patent: Apr. 5, 2022

(54) DEVICE FOR CONTROLLING A DOOR OF A VEHICLE AND AIRCRAFT

(71) Applicant: Airbus Operations GmbH, Hamburg (DE)

(72) Inventors: Philippe Raviart, Hamburg (DE); Ulf Kehlenbeck, Hamburg (DE); Matias Mail, Hamburg (DE); Sascha Rodewald, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 254 days.

(21) Appl. No.: 16/387,421

(22) Filed: Apr. 17, 2019

(65) Prior Publication Data

US 2019/0330905 A1 Oct. 31, 2019

(30) Foreign Application Priority Data

Apr. 26, 2018 (DE) .......................... 102018110021.3

(51) Int. Cl.
| | | |
|---|---|---|
| *E05F 15/00* | (2015.01) | |
| *E05F 15/40* | (2015.01) | |
| *B64C 1/14* | (2006.01) | |
| *E05F 15/611* | (2015.01) | |

(52) U.S. Cl.
CPC ............ *E05F 15/40* (2015.01); *B64C 1/1415* (2013.01); *E05F 15/611* (2015.01); *E05Y 2400/54* (2013.01); *E05Y 2900/502* (2013.01); *E05Y 2900/531* (2013.01)

(58) Field of Classification Search
CPC ......... E05F 15/53; E05F 15/54; E05F 15/611; E05F 15/40; E05F 15/41; E05F 15/42; E05Y 2400/532; E05Y 2400/336; E05Y 2900/531; E05Y 2900/502; E05Y 2400/54; E05Y 2400/32; G07C 9/00309; E05B 77/22; B64D 45/00; B64D 25/00; B64C 1/14; B64C 1/1415; B64C 1/1438
USPC .................................. 49/26, 27, 28, 29, 118
See application file for complete search history.

(56) References Cited

U.S. PATENT DOCUMENTS

| | | | | |
|---|---|---|---|---|
| 5,131,506 A | * | 7/1992 | Mizuno | .................... G05D 3/12 |
| | | | | 187/316 |
| 5,530,329 A | * | 6/1996 | Shigematsu | ......... H02H 7/0851 |
| | | | | 318/469 |
| 6,445,192 B1 | * | 9/2002 | Lovegren | ............... G01F 23/284 |
| | | | | 324/644 |

(Continued)

FOREIGN PATENT DOCUMENTS

| | | |
|---|---|---|
| DE | 10056994 C1 | 2/2002 |
| DE | 102013102608 A1 | 9/2014 |

(Continued)

*Primary Examiner* — Chi Q Nguyen
(74) *Attorney, Agent, or Firm* — Greer, Burns & Crain, Ltd.

(57) ABSTRACT

A device for controlling a door of a vehicle includes a drive unit that pivots the door between closed and open positions, wherein the closed and open positions define a pivoting range of the door. The device includes a control unit to control the drive unit. The device also includes a sensor unit that monitors the pivoting range. The sensor unit transmits a collision signal when an object is in the pivoting range while the drive unit is pivoting the door. The control unit transmits a switch-off signal to the drive unit if the control unit receives the collision signal.

15 Claims, 5 Drawing Sheets

(56) References Cited

U.S. PATENT DOCUMENTS

| | | | |
|---|---|---|---|
| 6,449,152 B1* | 9/2002 | Lin | H01L 23/4006 |
| | | | 165/80.3 |
| 10,494,852 B2* | 12/2019 | Fujita | E05B 65/0882 |
| 2002/0060270 A1 | 5/2002 | Buchs et al. | |
| 2003/0154656 A1* | 8/2003 | Fitzgibbon | E05F 15/668 |
| | | | 49/26 |
| 2005/0285553 A1* | 12/2005 | Gregori | E05F 15/41 |
| | | | 318/280 |
| 2008/0294314 A1 | 11/2008 | Morris et al. | |
| 2009/0242310 A1* | 10/2009 | Touge | G01S 15/931 |
| | | | 180/289 |
| 2009/0272605 A1* | 11/2009 | Utsunomiya | B66B 13/143 |
| | | | 187/316 |
| 2010/0242363 A1* | 9/2010 | Hirota | E05F 15/41 |
| | | | 49/28 |
| 2013/0099524 A1* | 4/2013 | Brown | E05F 15/605 |
| | | | 296/146.9 |
| 2013/0284855 A1* | 10/2013 | Muller-Dauch | E06B 3/32 |
| | | | 244/129.5 |
| 2014/0373447 A1* | 12/2014 | Gunreben | E05F 15/70 |
| | | | 49/31 |
| 2015/0096233 A1* | 4/2015 | Kojima | E05F 15/40 |
| | | | 49/31 |
| 2015/0121758 A1 | 5/2015 | Pohl | |
| 2015/0224859 A1* | 8/2015 | Warburton | E05F 5/12 |
| | | | 701/49 |
| 2017/0335615 A1* | 11/2017 | Herrmann | E05F 15/40 |
| 2020/0254928 A1* | 8/2020 | Monteiro | E05F 15/40 |
| 2020/0407036 A1* | 12/2020 | Zekiecki | B64D 25/00 |

FOREIGN PATENT DOCUMENTS

| | | |
|---|---|---|
| EP | 1270405 B1 | 5/2006 |
| JP | H11255121 A | 9/1999 |
| KR | 20120137961 A | 12/2012 |

\* cited by examiner

DEVICE FOR CONTROLLING A DOOR OF A VEHICLE AND AIRCRAFT

CROSS-REFERENCE TO PRIORITY APPLICATION

This application claims the benefit of, and priority to, German patent application number DE 102018110021.3, filed Apr. 26, 2018. The content of the referenced application is incorporated by reference herein.

TECHNICAL FIELD

Embodiments of the subject matter described herein relate generally to a device for controlling a door of a vehicle or other means of transportation, and to an aircraft.

BACKGROUND

Freight spaces in transportation means, such as e.g. in aircraft or other vehicles, are closed off by freight doors. In this context, inter alia the luggage of passengers or freight is transported in the freight spaces. The opening and closing of the freight doors requires a plurality of manual steps in order to gain access to the freight space. In this context, the freight door must first be released and unlocked manually using a handle which is attached to the freight door. Afterwards, in the case of hydraulically operated freight doors, as known, e.g., from patent publication EP 1 270 405 B1, activation must be carried out either by means of a control valve or a toggle switch in order to activate the freight door. If the freight door is opened, it is locked by an internal mechanical locking in order to permit safe unloading of the aircraft. In order to close the freight door, the control valve must be activated again until the freight hatch closes. The freight door is then locked and blocked by activating a handle which is attached to the freight door.

For the above-mentioned freight doors the operating personnel requires additional means and tools, such as ladders or platforms, in order to gain access to the bolt or the locking handle and the operator control panel of the freight hatch. The opening and closing therefore require a large amount of time and a plurality of manual steps which have to be carried out.

BRIEF SUMMARY

The object of the present disclosure is to make available a device and a method which simplify the activation of the freight doors.

The object is achieved by means of the features of the independent claims. Advantageous developments are the subject matter of the dependent claims and of the following description.

A device for controlling a door of a transportation means is provided, wherein the device comprises: a drive unit for pivoting the door between a closed position and an open position, wherein the closed position and the open position define a pivoting range of the door, and a control unit for controlling the drive unit, wherein according to the disclosure there is provision that the device has a sensor unit for monitoring the pivoting range, wherein the sensor unit is designed to transmit a collision signal if an object is arranged in the pivoting range while the drive unit is pivoting the door, and wherein the control unit is designed to transmit a switch-off signal to the drive unit if the control unit receives the collision signal.

With the device for controlling the door of a transportation means a device is made available with which it is no longer necessary to carry out manual operations in order to open and close a door on a transportation means. Objects in the pivoting range of the door are sensed by means of the sensor unit. The sensing of objects can already take place before the start of the pivoting of the door, in order to indicate freedom of movement of the door before the pivoting. If an object is sensed, the sensor unit transmits a signal to the control unit which controls the drive unit. In reaction to the collision signal, the control unit transmits a switch-off signal to the drive unit of the door. As a result, the drive unit of the door is switched off and the door is not pivoted further. The door therefore stops before it collides with the object in the pivoting range. The operating personnel is therefore assisted in monitoring the pivoting range, and given corresponding approval specifications manual monitoring of the pivoting range can be dispensed with entirely. Therefore, the handling of the door of the transportation means is facilitated considerably.

A transportation means can be in this context, for example, an aircraft, a space craft, a ship or a motor vehicle.

The term door comprises any type of door, cover or hatch which closes off an access opening of a space of a transportation means and is pivoted during closing and opening.

According to one advantageous example, the drive unit is an electromechanical drive. An electromechanical drive can be stopped more quickly than a hydraulic drive, which was previously used for doors of transportation means. Therefore, the safety of the handling of the door during the pivoting is increased further and more precise control of the door is made possible.

According to one advantageous example, the control unit is designed to transmit an opening signal and/or closing signal to the drive unit. Therefore, the opening and closing of the door can be controlled completely by the control unit. If the control unit receives a collision signal from the sensor unit before the pivoting of the door has started, the control unit refrains from transmitting an opening signal or closing signal. This permits fully automated opening and closing of the door of the transportation means.

According to one advantageous example, the drive unit is designed to pivot the door into the open position if the drive unit receives the opening signal, and/or to pivot the door into the closed position if the drive unit receives the closing signal.

According to one advantageous example, the sensor unit has at least one proximity sensor, preferably at least one ultrasonic sensor, and/or at least one optical sensor, preferably at least one video camera. The pivoting range of the door can be effectively monitored by means of the proximity sensors and/or the optical sensors. Objects which are only briefly located in the pivoting range can therefore be identified, with the result that when the objects exit the pivoting range before a collision between the door and the object can take place, a collision signal can be dispensed with. This improves the control of the door and avoids unnecessary interruptions in the opening or closing process.

According to one advantageous example, the drive unit is designed to slow down the pivoting of the door before the open position is reached. According to a further advantageous example, the drive unit is designed to slow down the pivoting before the closed position is reached. This avoids the door being pivoted at full speed into the open position or the closed position in which the door is then stopped. This avoids large forces during the deceleration process in the open position or in the closed position, with the result that material damage and fatigue damage is reduced or avoided. At the same time, the door can be opened or closed with a relatively high speed, since as a result of the deceleration process owing to the slowing down of the pivoting before the open position or the closed position is reached, the loading on the suspension of the door or door frame is relieved.

According to one advantageous example, the control unit is designed to transmit a locking signal and an unlocking signal to a locking unit for locking the door in the closed position. Therefore, manual operations are not required in order to lock and unlock the door in the closed position. The locking of the door in the closed position increases the safety in the freight space of the transportation means during the transportation. If the freight has not been correctly secured, the locking of the freight door prevents unsecured freight from pressing on the door and exiting the transportation means during transportation. Furthermore, the handling is facilitated further by the transmission of the locking signal and of the unlocking signal by the control unit.

According to one advantageous example, the control unit is designed to transmit a locking signal and an unlocking signal to a locking unit for locking the door in the open position. Therefore, manual operations are not required in order to lock and unlock the door in the open position. As a result of the locking of the door in the open position, the safety when loading the transportation means is increased, since the situation is avoided in which the door closes unintentionally during the loading process. Furthermore, the handling is facilitated further by the transmission of the locking signal and of the unlocking signal by the control unit.

Fully automatic operation of the door can occur if in one example a control unit is provided which transmits a locking signal and an unlocking signal in the open position and in the closed position.

Furthermore, according to the disclosure an aircraft is provided comprising a door for a transportation means, wherein the door is designed to pivot between a closed position and an open position, wherein the closed position and the open position define a pivoting range, and a device according to the description given above, wherein the drive unit is operatively connected to the door.

The advantages and developments of the device are described above and correspond to those of the device in the aircraft. Therefore, in this respect reference is made to the preceding description.

According to one advantageous example, the aircraft or the door has a locking unit for locking the door in the closed position.

According to one advantageous example, the aircraft or the door has a locking unit for locking the door in the open position.

According to one advantageous example, the control unit has a user interface, wherein the user interface is arranged on the aircraft.

According to one advantageous example, the control unit has a user interface, wherein the user interface is connected to the control unit by means of a cableless signal connection. Remote control of the opening process or closing process can therefore be brought about. Given corresponding official approval specifications, the door can therefore be opened remotely without a visual connection, with the result that the operating personnel does not have to firstly enter the transportation means in order to open or close the door. Therefore, the handling of the door is facilitated further by means of the device.

Furthermore, according to the disclosure a method for controlling a door of a transportation means by means of a device according to the description given above is provided, wherein the method has the following steps: a) pivoting the door between a closed position and an open position by means of the drive unit, wherein the closed position and the open position define a pivoting range of the door; wherein according to the disclosure there is provision for: b) monitoring the pivoting range by means of the sensor unit; b) transmitting a collision signal by means of the sensor unit if an object is arranged in the pivoting range while the drive unit is pivoting the door; and d) transmitting a switch-off signal to the drive unit by means of the control unit if the control unit receives the collision signal.

The advantages and developments of the method correspond to the advantages and developments of the device and of the aircraft described above. Therefore, in this respect reference is made to the preceding description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the section which follows, subject matter will be described on the basis of an exemplary embodiment by means of the appended drawing, in which.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
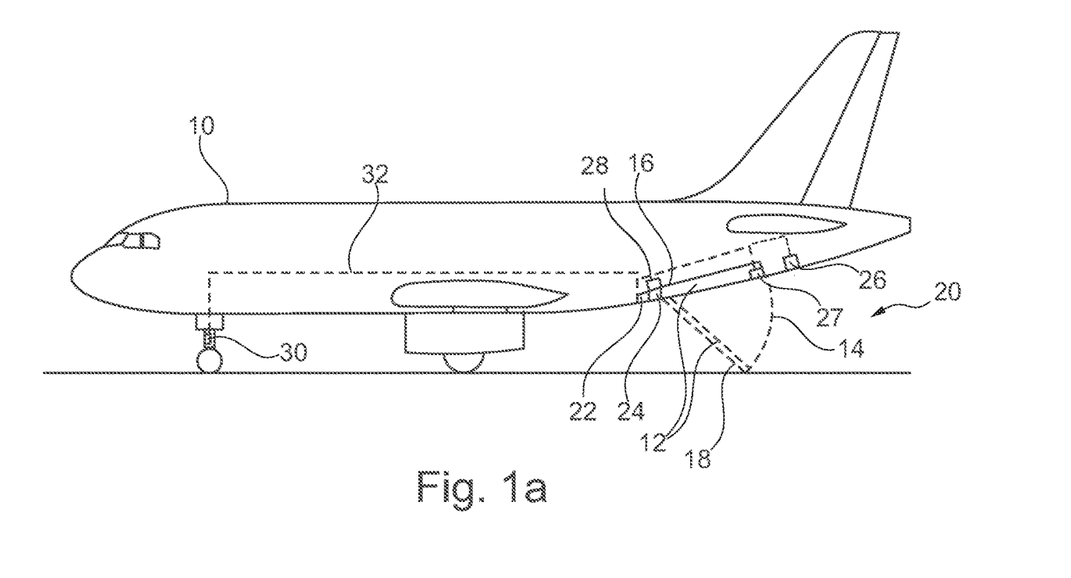
FIGS. 1a-c show schematic illustrations of a transportation means with the device.
Figure 1B:
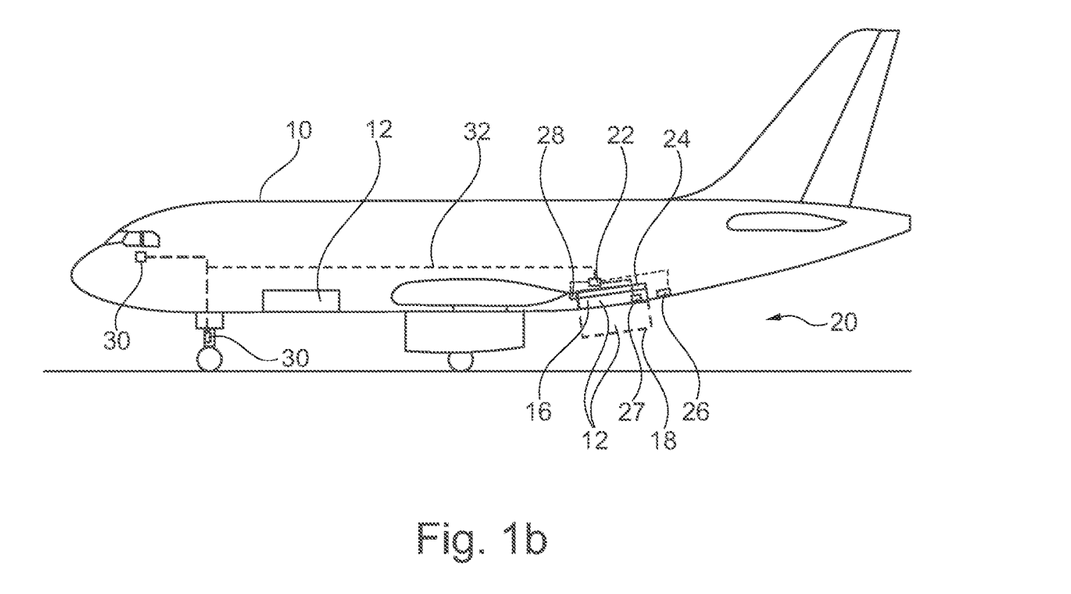

The device will be denoted in its entirety below by the reference number 20, as illustrated in FIGS. 1a and 1b.

Figure 1C:
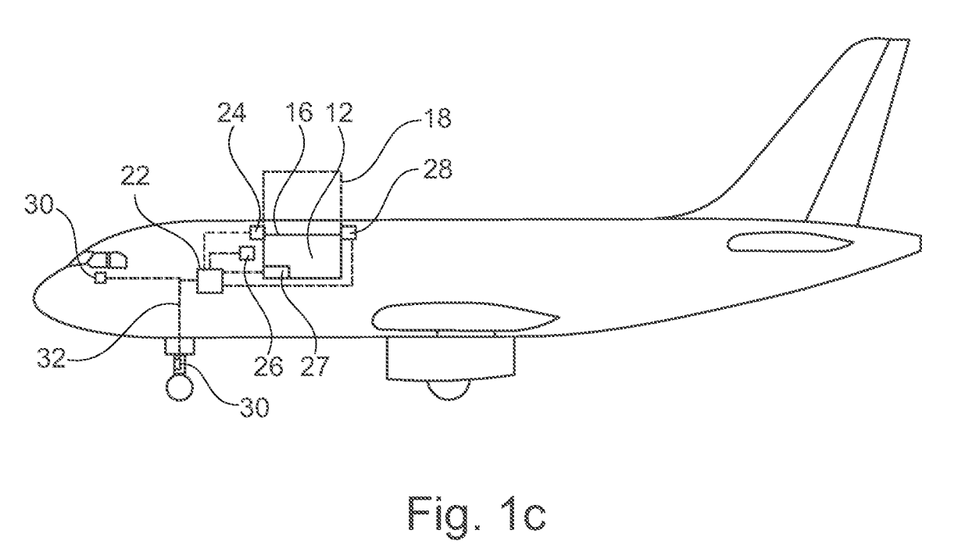

FIGS. 1a to 1c show a transportation means 10 in the form of an aircraft. The transportation means 10 has a door 12 which leads to a freight space in the lower decks of the aircraft. The door 12 comprises here a closed position 16 in which it is drawn by a continuous line, and an open position 18 which is illustrated by dashed lines in FIG. 1a. Furthermore, the door 12 is pivotably connected to the transportation means 10. The door 12 can therefore be pivoted between the closed position 16 and the open position 18. The range which the door 12 passes through here is defined as the pivoting range 14.

Furthermore, the transportation means has the device 20, wherein the device 20 comprises a control unit 22, a drive unit 24 and a sensor unit 26, 27.

The drive unit 24 is operatively connected to the door 12, i.e. the drive unit 24 is designed to pivot the door 12 between the open position 18 and the closed position 16. The drive unit 24 can be connected here directly to the door 12 or indirectly via a mechanical coupling. The drive unit 24 can be an electromechanical drive here. An electromechanical drive can be controlled here without a large amount of expenditure and can also be stopped in any position without a large amount of expenditure.

The sensor unit 26, 27 monitors the pivoting range 14 of the door 12. The sensor unit 26, 27 is designed here to transmit a collision signal if an object is arranged in the pivoting range 14 or if an object moves into the pivoting range 14.

The control unit 22 controls the drive unit 24. In this context the control unit 22 transmits an opening signal to the drive unit 24 if the door 12 is to be moved from the closed position 16 into the open position 18. If the door 12 is to be moved from the open position 18 into the closed position 16, the control unit 22 transmits a closing signal to the drive unit 24.

The control unit 22 also comprises here a user interface 30. In the exemplary embodiments which are illustrated in FIGS. 1a to 1c the user interface 30 is arranged on a front aircraft wheel. The user interface 30 can, however, also be arranged in the cockpit, as illustrated by way of example in FIGS. 1b and 1c. Furthermore, the user interface can be arranged on the aircraft at further positions on the aircraft, such as e.g. in the freight space itself or on a door of the transportation means which is used by the crew. The operating personnel can bring about the opening and the closing of the door 12 by means of the user interface 30. The user interface 30 transmits here an activation signal to the control unit 22, which activation signal indicates the activation of the user interface 30 to the control unit 22. The opening signals and the closing signals are transmitted to the drive unit 24 in reaction to an activation signal from the control unit 22.

If the control unit 22 receives the collision signal from the sensor unit 26, 27, it transmits a switch-off signal to the drive unit 24. The reception of the switch-off signal by the drive unit 24 brings about the switching off of the drive unit 24. The opening process or the closing process of the door 12 are as a result interrupted. The drive unit 24 is therefore switched off if an object is sensed in the pivoting range 14 by the sensor unit 26, 27.

The device 20 can also have a locking unit 28. The locking unit 28 can be arranged and attached on the door 12 or on the transportation means 10. The locking unit 28 locks here the door 12 on the transportation means 10. The control unit 22 transmits locking signals and unlocking signals to the locking unit 28 if the locking state of the door 12 on the transportation means 10 is to be changed. If the locking unit 28 receives a locking signal, it locks the door 12 on the transportation means. If the locking unit 28 receives an unlocking signal, it unlocks the door 12.

The transmission of the unlocking signal and of the locking signal can take place as a function of the locking state of the door 12. When the door 12 is already locked, the control unit 22 transmits an unlocking signal. When the door 12 is already unlocked, the control unit 22 transmits a locking signal.

The locking unit 28 can lock the door 12 in the locked position 16 on the transportation means 10 here. Furthermore, the locking unit 28 can lock the door 12 in the open position 18 on the transportation means 10. If the door 12 is locked in the closed position 16 or in the open position 18, the locking unit 28 must firstly be unlocked so that the door 12 can be pivoted.

FIGS. 1a to 1c show different embodiments of the doors 12 on transportation means 10. In FIG. 1a, the door 12 is embodied as a loading ramp, wherein the door 12 is pivoted about an axis which is arranged transversally with respect to the direction of movement of the transportation means 10. The axis can also be oriented horizontally on the floor.

In FIG. 1b, the door 12 is embodied as a freight space hatch to the lower deck which is pivoted about an axis which is arranged parallel to the direction of locomotion of the transportation means 10. The aircraft which is depicted in FIG. 1b can be a passenger aircraft here, wherein the freight and the pieces of luggage are stored in the lower decks of the aircraft.

In FIG. 1c, the door 12 is embodied as a freight space flap to the upper deck, which freight space hatch is pivoted about an axis which is arranged parallel to the direction of locomotion of the transportation means 10.

Figure 2A:
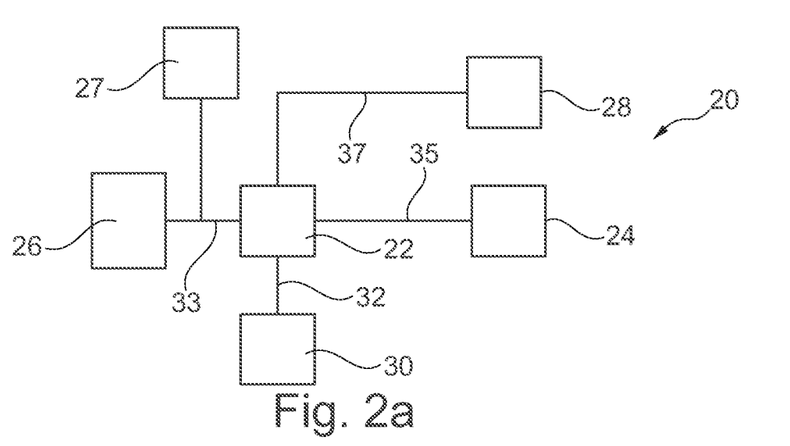
FIGS. 2a and 2b show schematic illustrations of a device for controlling a door of a transportation means.
Figure 2B:
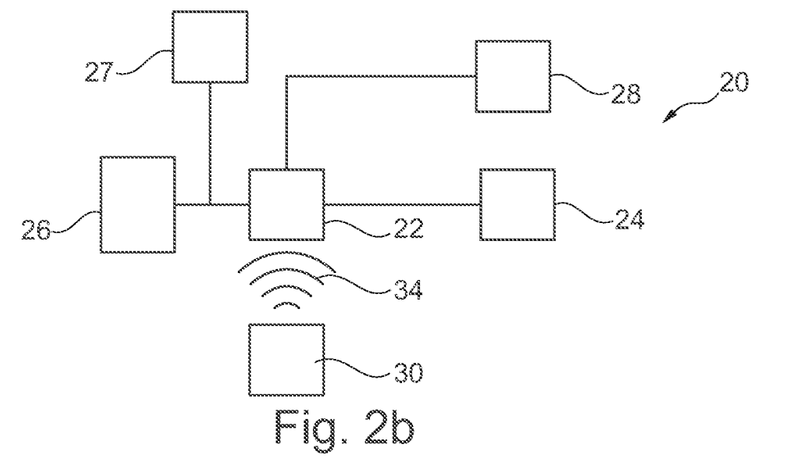

FIGS. 2a and 2b show different embodiments of the device 20. In FIG. 2a, an embodiment is shown in which the user interface 30 is connected to the control unit 22 via a cable connection 32. Via the cable connection 32, a user can transmit an activation signal to the control unit 22 by means of the user interface 30. Depending on the opening state of the door 12 and the signal, which has most recently been transmitted to the drive unit 24, the control unit 22 can transmit the opening signal or the closing signal to the drive unit 24 via the signal connection 35 in reaction to the activation signal. Furthermore, the control unit 22 can transmit the switch-off signal to the drive unit 24 via the signal connection 35.

The control unit 22 is also connected via signal connections 33 to the sensors of the sensor unit 26, 27. The collision signal can therefore be transmitted to the control unit 22 via the signal connection 33. Furthermore, the control unit 22 can transmit the unlocking signal and the locking signal to the locking unit 28 via the signal connection 37.

FIG. 2b shows a cableless signal connection 34 between the user interface 30 and the control unit 22. In this embodiment the activation signal is transmitted via the cableless signal connection 34 to the control unit 22 from the user interface 30. Depending on the official approval specifications, the user interface 30 can transmit the activation signal before a direct visual connection is present between the user interface 30 or the user and the door 12.

Figure 3A:
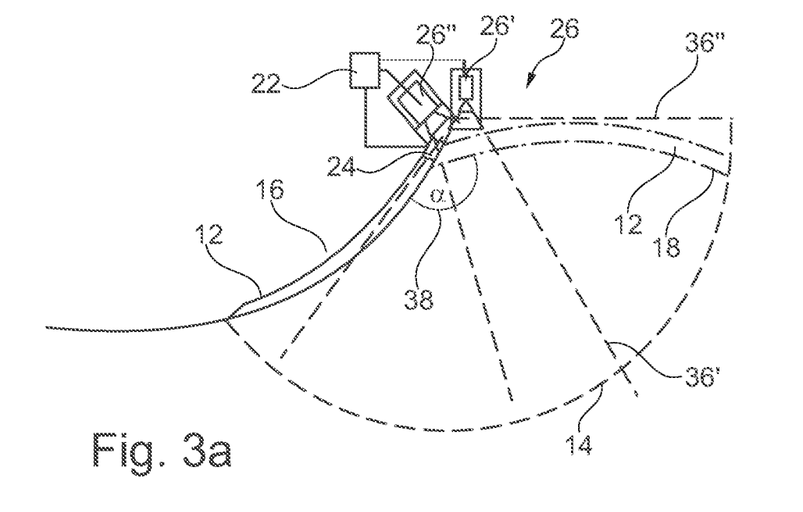
FIGS. 3a and 3b show schematic illustrations of devices on a door of a transportation means.
Figure 3B:
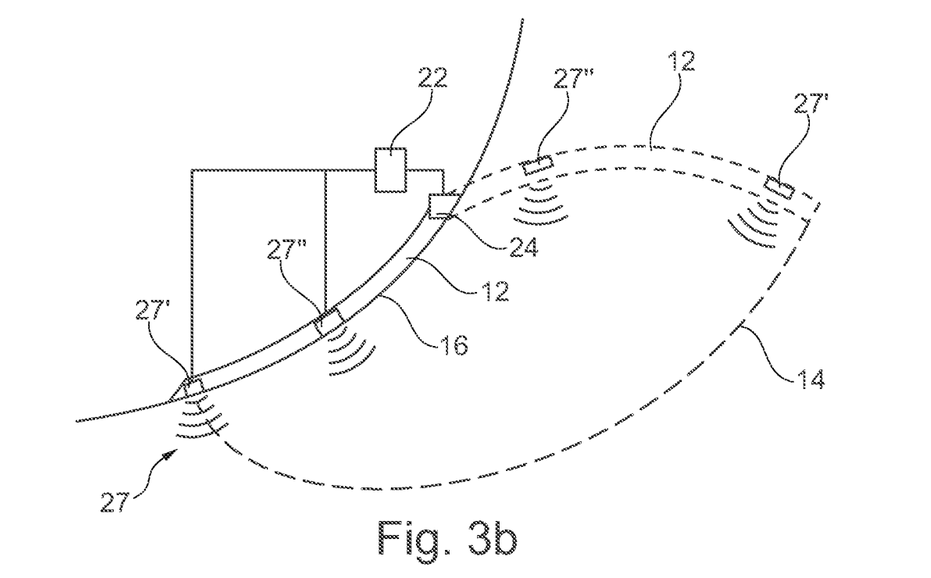

FIGS. 3a and 3b give more details about the sensor unit 26, 27. In FIG. 3a, the sensor unit 26, 27 has, in one exemplary embodiment, optical sensors 26' 26" in the form of video cameras. The video cameras monitor different viewing angles 36' and 36" here. As a result of the different viewing angles 36' and 36" the optical sensors 26' and 26" have the entire pivoting range 14 in view. The sensor unit 26, 27 transmits a collision signal here if an object is located in the pivoting range 14 or if an object enters the pivoting range 14.

In another exemplary embodiment according to FIG. 3b, the sensor unit 26, 27 has proximity sensors 27' and 27". The proximity sensors 27', 27" transmit a collision signal here if during the pivoting in the pivoting range 14 the door 12 approaches an object which is arranged in the pivoting range 14. The sensor unit 26, 27 is embodied here in such a way that during the opening and during the closing the proximity sensors 27' and 27" can sense approaching objects in the pivoting range 14 in the path of the door 12.

In a further exemplary embodiment, the sensor unit 26, 27 can have both optical sensors 26', 26" and proximity sensors 27' 27".

Figure 4A:
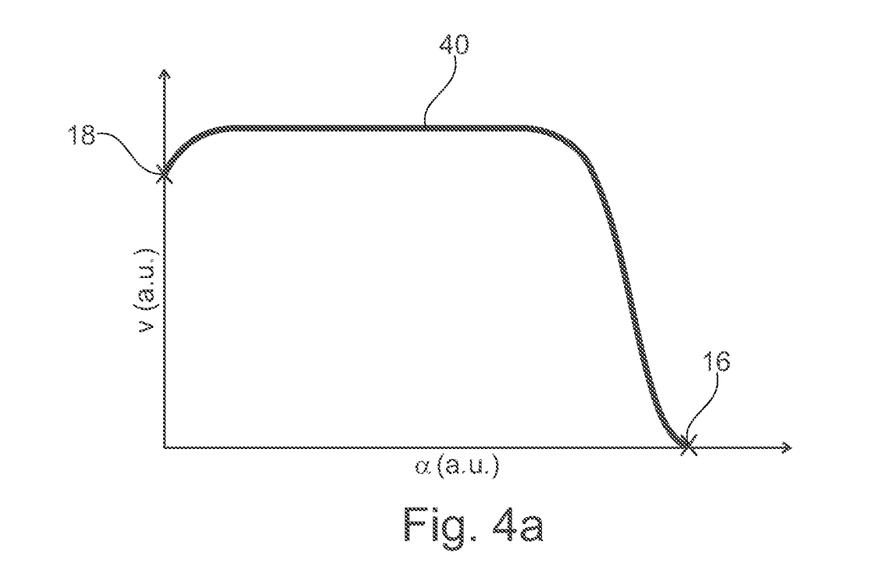
FIGS. 4a and 4b show schematic diagrams of the opening and closing speed.

The drive unit 24 is also designed to slow down the pivoting of the door 12 before the closed position 16 is reached, as illustrated in FIG. 4a. In this context, the speed in the pivoting range 14 is plotted in any desired units with respect to the angle of the door 12, which angle is represented in any desired units. The angular positions at which the closed position 16 and the open position 18 are located are also represented. The diagram shows here the speed curve 40 which is arranged at a constant high level for angles starting from the open position 18 after a brief run-up phase up to an angle just before the closed position 16. Afterwards, the speed slows down for the angles which are close to the closed position 16. This shows the deceleration of the closing process, which deceleration is brought about just before the closed position 16 by means of the drive unit 24.

Figure 4B:
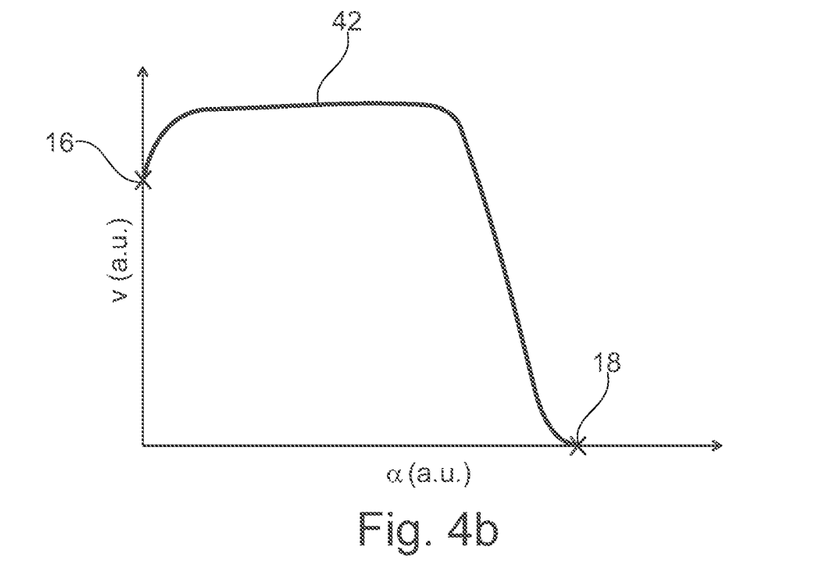

Furthermore, the drive unit 24 is designed to slow down the pivoting of the door 12 before the open position 18 is reached, as illustrated in FIG. 4b. The speed in the pivoting range 14 is here also plotted in any desired units with respect to the angle of the door 12, which angle is represented in any desired units. The angular positions at which the closed position 16 and the open position 18 are located are also illustrated, wherein the positions differ in contrast to FIG. 4a. In FIG. 4b, in contrast to FIG. 4a, the door 12 is pivoted from the closed position 16 to the open position 18. The speed curve is denoted here by the reference number 42. Starting from the closed position 16, the speed curve 42 firstly has a constant high level after a brief run-up phase, which high level is slowed down near to the open position 18 as the approach continues. Therefore, it is also shown here that a deceleration of the opening process just before the opening position 18 is brought about by means of the drive unit 24.

Figure 5:
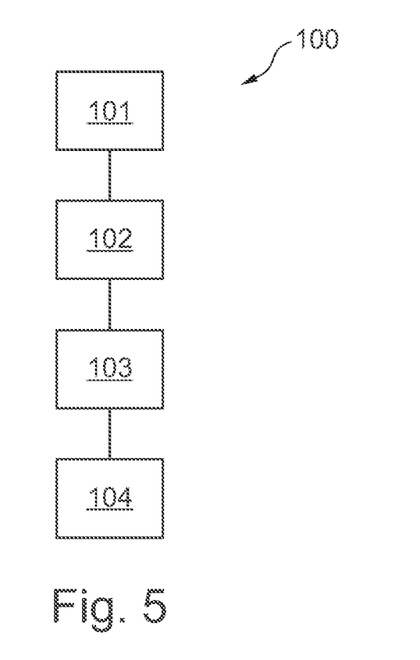
FIG. 5 shows a schematic flow chart of the method for controlling a door of a transportation means.

FIG. 5 shows a flow chart of the method 100 for controlling a door of a transportation means. In a step a), the door is pivoted 101 between the closed position and the open position by means of the drive unit. In a step b), the pivoting range is monitored 102 by means of the sensor unit. In a step c), a collision signal is transmitted 103 by the sensor unit if an object is arranged in the pivoting range during the pivoting of the door by means of the drive unit. In step d), a switch-off signal is transmitted 104 to the drive unit if the control unit receives the collision signal. The drive unit can be an electromechanical drive here.

Steps b) and c) can already be carried out here before step a) is started. By means of the method the sensor unit can accordingly already monitor the pivoting range, and if appropriate transmit 103 a collision signal before the pivoting 101 of the door.

Furthermore, the method can comprise the step of transmitting an opening signal and/or a closing signal to the drive unit by means of the control unit.

In a further step the method can comprise: pivoting of the door into the open position by means of the drive unit if the drive unit receives the opening signal, and/or pivoting of the door into the closed position by means of the drive unit if the drive unit receives the closing signal.

The sensor unit can have at least one proximity sensor, preferably at least one ultrasonic sensor, and/or at least one optical sensor, preferably at least one video camera. In this context, the method can comprise the step of sensing an object in the pivoting range by means of the sensor unit.

The method can also comprise the step of slowing down the pivoting before the open position is reached by means of the drive unit. Alternatively or additionally, the method can have the step of slowing down the pivoting before the closed position is reached by means of the drive unit.

By means of the control unit, the method can also have the step of transmitting a locking signal and an unlocking signal to a locking unit for locking the door in the closed position. Alternatively or additionally, the method can comprise the step of transmitting a locking signal and an unlocking to a locking unit for locking the door in the open position by means of the control unit.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device for controlling a door of a vehicle, the device comprising:
   a drive unit that pivots the door between a closed position and an open position, wherein the closed position and the open position define a pivoting range of the door;
   a control unit that controls drive unit; and
   a sensor unit monitoring the pivoting range of the door for an object arranged in the pivoting range while the drive unit is pivoting the door, wherein the sensor unit transmits a collision signal indicating said object is arranged in the pivoting range while the drive unit is pivoting the door, wherein the control unit transmits a switch-off signal to the drive unit in response to receiving the collision signal.

2. The device according to claim 1, wherein the drive unit is an electromechanical drive.

3. The device according to claim 1, wherein the control unit transmits an opening signal to the drive unit.

4. The device according to claim 3, wherein:
   the drive unit pivots the door into the open position when the drive unit receives the opening signal; and
   a drive unit pivots the door into the closed position when the drive unit receives the closing signal.

5. The device according to claim 1, wherein the sensor unit comprises at least one proximity sensor.

6. The device according to claim 1, wherein the drive unit slows the pivoting before the open position is reached.

7. The device according to claim 1, wherein the drive unit slows the pivoting before the closed position is reached.

8. The device according to claim 1, wherein the control unit transmits a locking signal and an unlocking signal to a locking unit for locking the door in the closed position.

9. The device according to claim 1, wherein the control unit transmits a locking signal and an unlocking signal to a locking unit for locking the door in the open position.

10. An aircraft comprising:
    a door configured to pivot between a closed position and an open position, wherein the closed position and the open position define a pivoting range; and a device to control operation of the door, the device comprising:
    a drive unit operatively connected to the door, the drive unit configured to pivot the door between the closed position and the open position;
    a control unit that controls drive unit; and
    a sensor unit monitoring the pivoting range of the door for an object arranged in the pivoting range while the drive unit is pivoting the door, wherein the sensor unit transmits a collision signal indicating said object is arranged in the pivoting range while the drive unit is pivoting the door, wherein the control unit transmits a switch-off signal to the drive unit in response to receiving the collision signal.

11. The aircraft according to claim 10, wherein the aircraft or the door comprises a locking unit that locks the door in the closed position.

12. The aircraft according to claim 10, wherein the aircraft or the door comprises a locking unit that locks the door in the open position.

13. The aircraft according to claim 10, wherein the control unit comprises a user interface arranged on the aircraft.

14. The aircraft according to claim 10, wherein the control unit comprises a user interface connected to the control unit by a cableless signal connection.

15. A method of controlling a door of a vehicle using a device comprising:
    a drive unit that pivots the door between a closed position and an open position, wherein the closed position and the open position define a pivoting range of the door;
    a control unit that controls drive unit; and
    a sensor unit monitoring the pivoting range of the door for an object arranged in the pivoting range while the drive unit is pivoting the door wherein the sensor transmits a collision signal indicating said object is arranged in the pivoting range while the drive unit is pivoting the door, wherein the control unit transmits a switch-off signal to the drive unit in response to receiving the collision signal, the method comprising the steps of:
pivoting the door between the closed position and the open position with the drive unit, wherein the closed position and the open position define a pivoting range of the door;
monitoring the pivoting range with the sensor unit for said object arranged in the pivoting range while the drive unit is pivoting the door;
transmitting a collision signal with the sensor unit indicating said object is arranged in the pivoting range while the drive unit is pivoting the door; and
transmitting a switch-off signal to the drive unit with the control unit in response to the control unit receiving the collision signal.

\* \* \* \* \*